United States Patent
Wu et al.

(10) Patent No.: US 11,099,684 B2
(45) Date of Patent: Aug. 24, 2021

(54) METHOD AND STRUCTURE FOR A DRIVING CIRCUIT OF TOUCH PANEL TOUCH DEVICE AND TOUCH MODULE

(71) Applicant: SITRONIX TECHNOLOGY CORP., Hsinchu County (TW)

(72) Inventors: Chun-Kuan Wu, Hsinchu County (TW); Tsun-Sen Lin, Hsinchu County (TW)

(73) Assignee: Sitronix Technology Corp., Jhubei (TW)

( * ) Notice: Subject to any disclaimer, the term of this patent is extended or adjusted under 35 U.S.C. 154(b) by 0 days.

(21) Appl. No.: 14/196,309

(22) Filed: Mar. 4, 2014

(65) Prior Publication Data
US 2015/0205427 A1 Jul. 23, 2015

(30) Foreign Application Priority Data
Jan. 22, 2014 (TW) ................................ 103102375

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 2203/04103* (2013.01); *Y10T 29/4913* (2015.01)

(58) Field of Classification Search
CPC ......... G06F 2203/04103; G06F 3/0416; G06F 3/044
See application file for complete search history.

(56) References Cited

U.S. PATENT DOCUMENTS

| 5,410,329 A | 4/1995 | Tagawa et al. |
| 8,355,006 B2* | 1/2013 | Park ................ G02F 1/13338 345/156 |
| 2010/0060590 A1* | 3/2010 | Wilson ............. G06F 3/0416 345/173 |
| 2012/0044166 A1* | 2/2012 | Mizuhashi ........ G06F 3/0412 345/173 |
| 2012/0044195 A1* | 2/2012 | Nakanishi ......... G06F 3/0412 345/174 |

(Continued)

FOREIGN PATENT DOCUMENTS

| CN | 101930310 A | 12/2010 |
| CN | 102135829 A | 7/2011 |

(Continued)

*Primary Examiner* — Ram A Mistry
(74) *Attorney, Agent, or Firm* — Rosenberg, Klein & Lee

(57) ABSTRACT

The present invention relates to a driving circuit, the touch device thereof, the touch module thereof, and the method for manufacturing the same. The present invention comprises a control circuit, a scan circuit, a touch panel, and a detection circuit. The control circuit generates an input signal. The scan circuit comprises a plurality of signal generating circuits, which receive the input signal, generate a plurality of scan signals according to the input signal, and output the plurality of scan signals to the plurality of scan electrodes of the touch panel. The detection circuit detects the touch panel according to the plurality of scan signals and outputs a detection signal to the control circuit to let the control circuit know at least a touch point of the touch panel being touched.

17 Claims, 11 Drawing Sheets

(56) References Cited

U.S. PATENT DOCUMENTS

| | | | | |
|---|---|---|---|---|
| 2012/0182254 A1* | 7/2012 | Jang | .................... | G06F 3/03545 |
| | | | | 345/174 |
| 2012/0242597 A1* | 9/2012 | Hwang | ................ | G06F 3/0412 |
| | | | | 345/173 |
| 2013/0076646 A1* | 3/2013 | Krah | .................... | G06F 3/0414 |
| | | | | 345/173 |

FOREIGN PATENT DOCUMENTS

| | | | |
|---|---|---|---|
| CN | 102541330 | A | 7/2012 |
| CN | 103257738 | A | 8/2013 |
| CN | 103294298 | A | 9/2013 |
| TW | I245253 | B | 12/2005 |
| TW | 201351250 | A | 12/2013 |
| TW | 201519023 | A | 5/2015 |

* cited by examiner

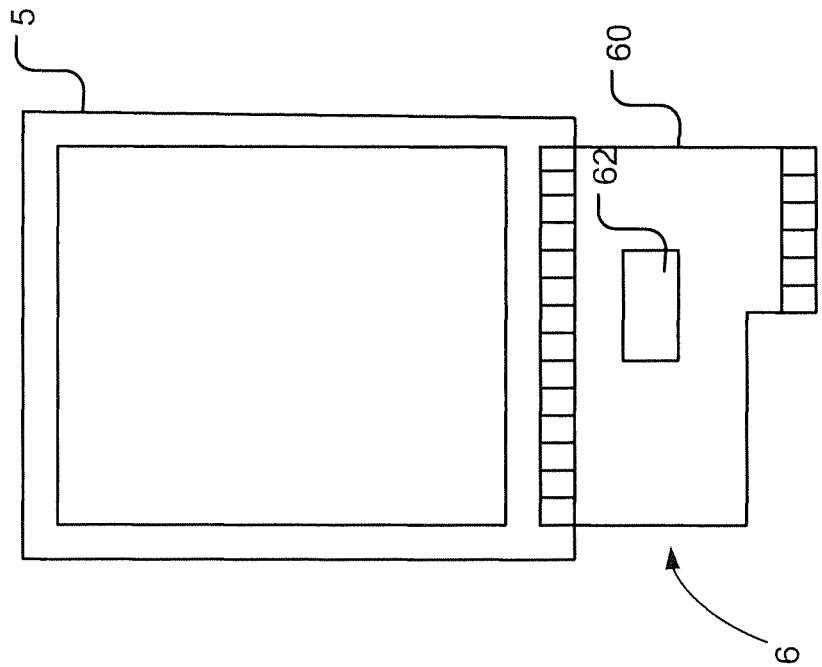
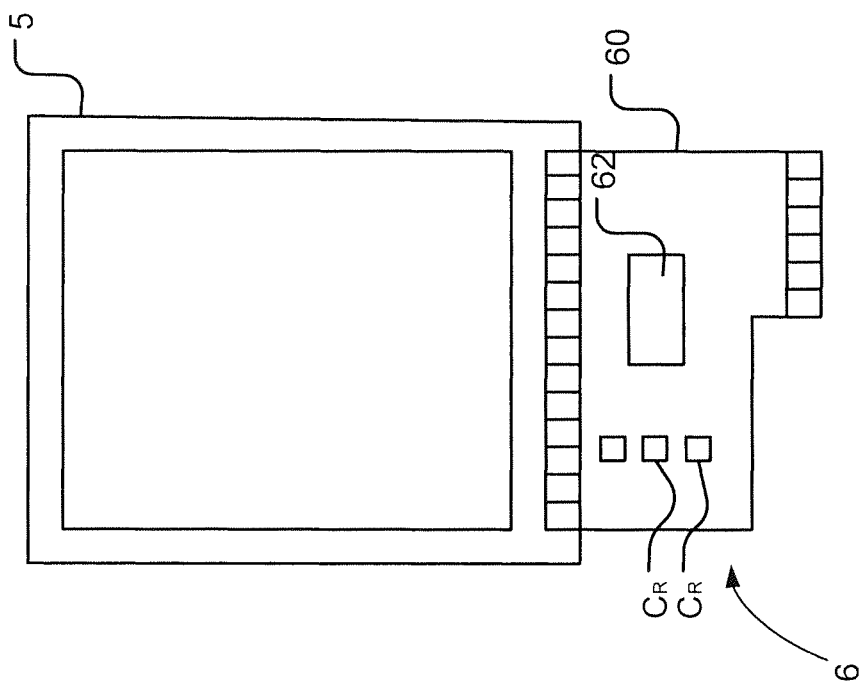

METHOD AND STRUCTURE FOR A DRIVING CIRCUIT OF TOUCH PANEL TOUCH DEVICE AND TOUCH MODULE

FIELD OF THE INVENTION

The present invention relates generally to a driving circuit, and particularly to a driving circuit, the touch device thereof, the touch module thereof, and the method for manufacturing the same.

BACKGROUND OF THE INVENTION

In recent years, in order to facilitate users using electronic devices with ease and intuition without prior complicated learning, touch panels have replaced traditional physical keyboards or mice in more electronic devices as input devices. A touch panel is a device attached to a display. A user can acquire the required information by touching the panel using fingers or pressing the panel lightly using a stylus. This technology saves the allocation space for keyboard. The saved space can be re-allocated to the display for enlarging the visible area for a user.

The sensing methods of current touch panels include resistive, capacitive, optical, and acoustic methods. A resistive touch panel adopts two sets, the top and bottom sets, of electrodes in charge of tasks in the X- and Y-axis coordinates. The pressure exerted by a finger on the touch panel makes the top and bottom electrodes contact, resulting in short circuit and voltage variation. By turning on and transmitting signals along the X- and the Y-axis alternately, the measured signals can be calculated by a controller and giving the touched location. The cost of a resistive touch panel is lower. Nonetheless, its sensitivity and transparency still cannot be improved effectively. An optical touch panel includes a transmitter and a receiver on both ends of the display, respectively. The principle is light receiving and sheltering. When the display is touched, the transmission of signal source will be interfered. Then the touch coordinates can be positioned. An acoustic touch panel includes an ultrasonic transmitter and a receiver forming a uniform acoustic field in the display area. When acoustic wave touches the finger, the touched location can be calculated by comparing the decay before and after finger application using a controller. At present, optical and acoustic methods are mainly applied to large-size displays.

Currently, compared with other touch technologies, capacitive touch panels have higher transmissivity, more delicate operability, endowing them with increasingly larger market share. A capacitive touch panel comprises sensing electrodes, wires, and a microprocessor. When a finger touches the sensing electrode, an electrical signal variation will be formed on the sensing electrode. This electrical signal is transmitted to the microprocessor by the wire. Then the microprocessor calculates the touch coordinates according to the electrical signal.

Please refer to FIG. 1, which shows a schematic diagram of the touch device according to the prior art. As shown in the figure, the touch device according to the prior art comprises a control circuit 10, a scan circuit 12, a detection circuit 14, a touch panel 16, and a power unit 18. The power unit 18 boosts the voltage output by the control circuit 10 and generates a scan signal $V_H$, and transmits the scan signal $V_H$ to a plurality of scan electrodes 161 of the touch panel 16 sequentially. If a touch point is touched, the detection circuit 14 will detects variation in voltage level via the corresponding detection electrode 163. Then the detection circuit 14 outputs the detecting signal $V_S$ to the control circuit 10 to enable the control circuit 10 knowing the touched location at the moment. For example, when the touch point A is touched, the scan signal $V_H$ is transmitted to the touch point A via the third scan electrode 161. The detecting signal 14 detects the variation in voltage level of the touch point A via the third detection electrode 163. Next, the detection circuit 14 outputs the detecting signal $V_S$ to the control circuit 10, so that the control circuit 10 knows the touched location at this moment is the touch point A.

According to the above description, the touch device according to the prior art generates the scan signal $V_H$ by boosting a voltage. Thereby, a power unit 18 is required in the touch device according to the prior art. In addition, because, in the touch device according to the prior art, the scan signal $V_H$ generated by the boost circuit is distributed to the plurality of scan electrodes 161, the boost circuit needs to have a greater output power. For a boost circuit having high output power, an external large-capacitance voltage stabilizing capacitor $C_R$ is required at the output for stabilizing the output voltage. Thereby, the circuit area will be increased. In addition, the cost of external components will be increased as well.

Accordingly, for solving the problems described above, the present invention provides a driving circuit requiring no voltage stabilizing capacitor and the touch device thereof, the touch module thereof, and the method for manufacturing the same.

SUMMARY

An objective of the present invention is to provide a driving circuit, the touch device thereof, the touch module thereof, and the method for manufacturing the same. A plurality of scan signals are generated by using a plurality of signal generating circuits. In addition, the parasitic capacitor of the touch panel is used as the voltage stabilizing capacitor. Thereby, no voltage stabilizing capacitor is required, and thus achieving the efficacies of reducing circuit area and cost of external components.

In order to achieve the above-mentioned objective and efficacies, the present invention discloses a touch device, which comprises a control circuit, a scan circuit, and a detection circuit. The control circuit generates an input signal. The scan circuit comprises a plurality of signal generating circuits corresponding to at least one of a plurality of scan electrodes of a touch panel, respectively. The plurality of signal generating circuits receive the input signal, generate a plurality of scan signals according to the input signal, and transmit the plurality of scan signals to the plurality of scan electrodes. The detection circuit detects the touch panel according to the plurality of scan signals and outputs a detecting signal to the control circuit so that the control circuit knows at least a touch point of the touch panel being touched.

The present invention further discloses a driving circuit of a touch device, which comprises a control circuit and a plurality of signal generating circuits. The control circuit generates an input signal. The plurality of signal generating circuits correspond to a plurality of scan electrodes of a touch panel, respectively, receive the input signal, generate a plurality of scan signals according to the input signal, and transmit the plurality of scan signals to the corresponding plurality of scan electrodes, respectively.

The present invention further discloses a driving circuit of a touch device, which comprises a control circuit and at least a signal generating circuit. The control circuit generates an
} input signal. The signal generating circuit corresponds to at least one of a plurality of scan electrodes of a touch panel, respectively. The plurality of signal generating circuits receive the input signal, generate a plurality of scan signals according to the input signal, and transmit the plurality of scan signals to the plurality of scan electrodes, respectively.

The present invention further discloses a touch module, which comprises a flexible printed circuit used for connecting electrically to a touch panel and a chip disposed on the flexible printed circuit. The chip comprises a control circuit and a plurality of signal generating circuits. The control circuit generates an input signal. The plurality of signal generating circuits correspond to a plurality of scan electrodes of a touch panel, respectively. The plurality of signal generating circuits receive the input signal, generate a plurality of scan signals according to the input signal, and transmit the plurality of scan signals to the corresponding plurality of scan electrodes, respectively.

The present invention further discloses a touch module, which comprises a flexible printed circuit used for connecting electrically to a touch panel and a chip disposed on the flexible printed circuit. The chip comprises a control circuit and at least a signal generating circuit. The control circuit generates an input signal. The signal generating circuit corresponds to at least one of a plurality of scan electrodes of a touch panel, respectively. The plurality of signal generating circuits receive the input signal, generate a plurality of scan signals according to the input signal, and transmit the plurality of scan signals to the corresponding plurality of scan electrodes, respectively.

The present invention further discloses a method for manufacturing a touch panel comprising steps of providing a touch panel, a flexible printed circuit, and a driving chip; disposing the driving chip on the flexible printed circuit; and disposing the flexible printed circuit on the touch panel. In addition, no voltage stabilizing capacitor is required on the flexible printed circuit.

BRIEF DESCRIPTION OF THE DRAWINGS

FIG. 10A shows a structural schematic diagram of the touch module;

FIG. 10B shows a structural schematic diagram of the touch module according to the present invention.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
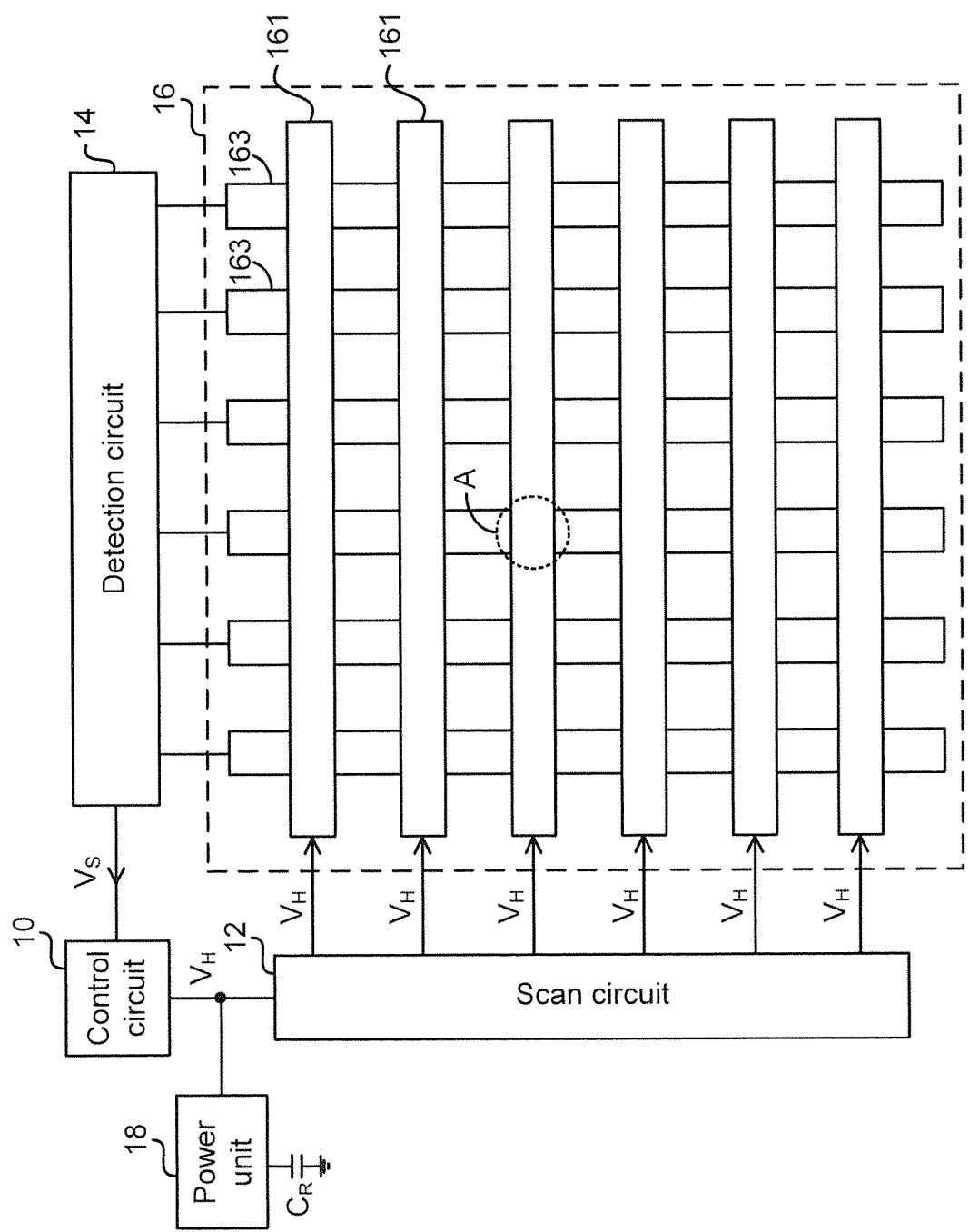
FIG. 1 shows a schematic diagram of the touch device according to the prior art.
Figure 2:
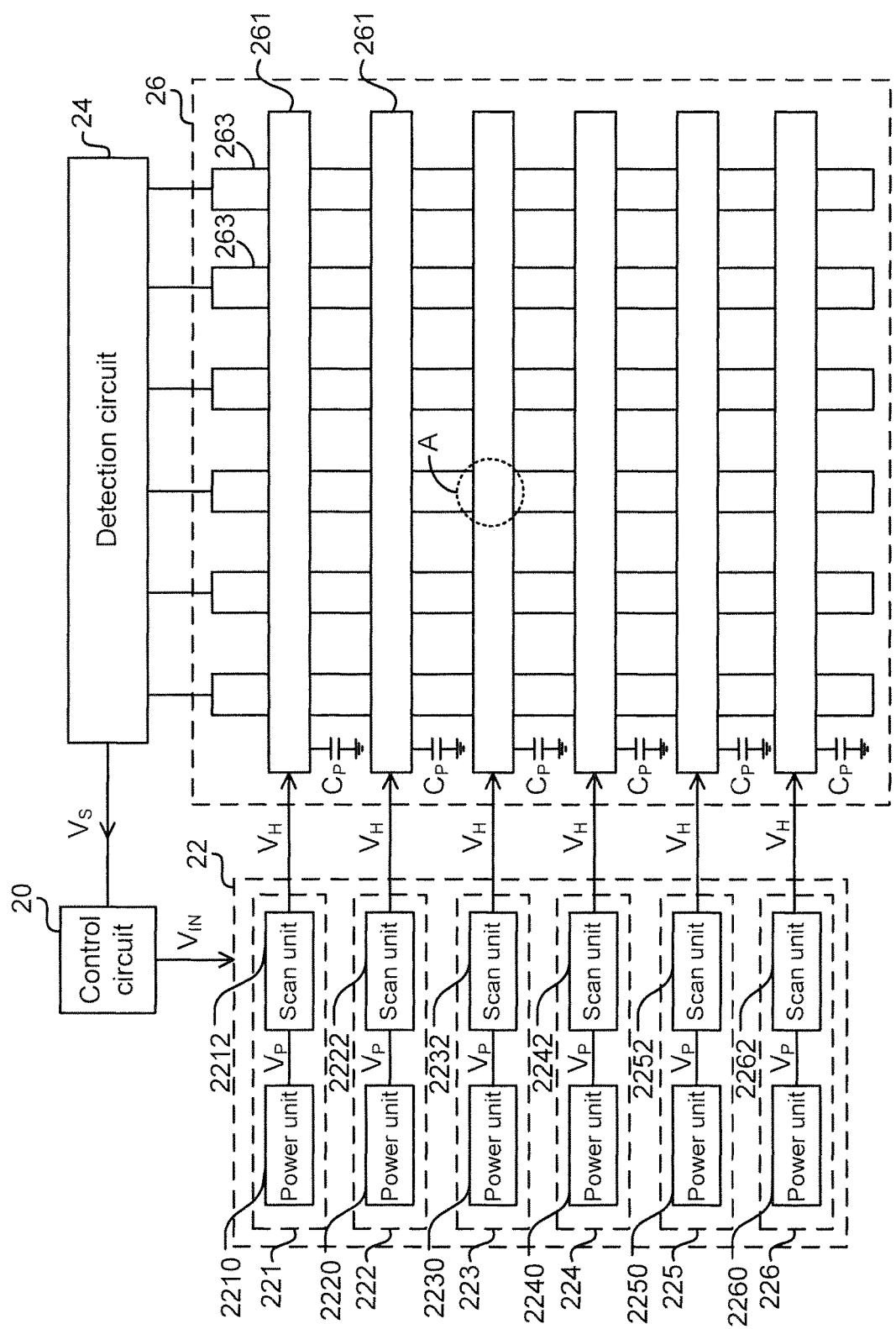
FIG. 2 shows a schematic diagram of the touch device according to the first embodiment of the present embodiment.

Please refer to FIG. 2, which shows a schematic diagram of the touch device according to the first embodiment of the present embodiment. As shown in the figure, the touch device comprises a control circuit 20, a scan circuit 22, a detection circuit 24, and a touch panel 26. The control circuit 20 outputs an input signal $V_{IN}$ to a plurality of signal generating circuits 221~226 in the scan circuit sequentially, so that the plurality of signal generating circuits 221~226 can generate scan signals $V_H$ sequentially according to the input signal $V_{IN}$. The touch panel 26 comprises a plurality of scan electrodes 261 and a plurality of detection electrodes 263. The plurality of scan electrodes 261 are coupled to the plurality of signal generating circuits 221~226, respectively, for receiving the plurality of scan signals $V_H$. The detection circuit 24 is coupled to the plurality of detection electrodes 263 for detecting a plurality of touch points of the touch panel 26.

If a touch point, for example, the touch point A, is touched, the scan signal $V_H$ is transmitted to the touch point A via the third scan electrode 261. Next, the detection circuit 24 detects variation in voltage level via the third detection electrode 263 and transmits the detecting signal $V_S$ to the control circuit 20. Then the control circuit 20 knows that the touched location at the moment is the touch point A.

The plurality of signal generating circuits 221~226 comprises a plurality of power units 2210~2260 and a plurality of scan units 2212~2262, respectively. The plurality of power units 2210~2260 can be a charge pump, a boost circuit, a low dropout (LDO) regulator, or any combination of the above (for example, combining a boost circuit and an LDO regulator or combining a charge pump and an LDO regulator), respectively, for boosting and stabilizing the input signal $V_{IN}$ and generating a supply voltage $V_P$. Then the supply voltage $V_P$ is transmitted to the plurality of scan units 2212~2262 for outputting the plurality of scan signals $V_H$. As a consequence, according to the present invention, it is not required to dispose an additional high-output-power boost circuit and add a large-capacitance voltage stabilizing capacitor.

Besides, because the plurality of signal generating circuits 221~226 output the plurality of scan signals to the plurality of scan electrodes 261, respectively, each of the signal generating circuits 221~226 only needs smaller output power. Hence, the signal generating circuits 221~226 also need small-capacitance internal capacitors only. Then the parasitic capacitor $C_P$ of the touch panel 26 can be used as the voltage stabilizing capacitor of the plurality of signal generating circuits 221~226 for stabilizing the voltages of the plurality of scan signals $V_H$ and requiring no other voltage stabilizing capacitor $C_R$. Furthermore, no voltage stabilizing capacitor is required at the outputs of the plurality of power units 2210~2260; no voltage stabilizing capacitor is required at the inputs of the plurality of scan units 2212~2262; or no voltage stabilizing capacitor is required on the paths connecting the plurality of power units 2210~2260 with the plurality of scan units 2212~2262, respectively.

Figure 3:
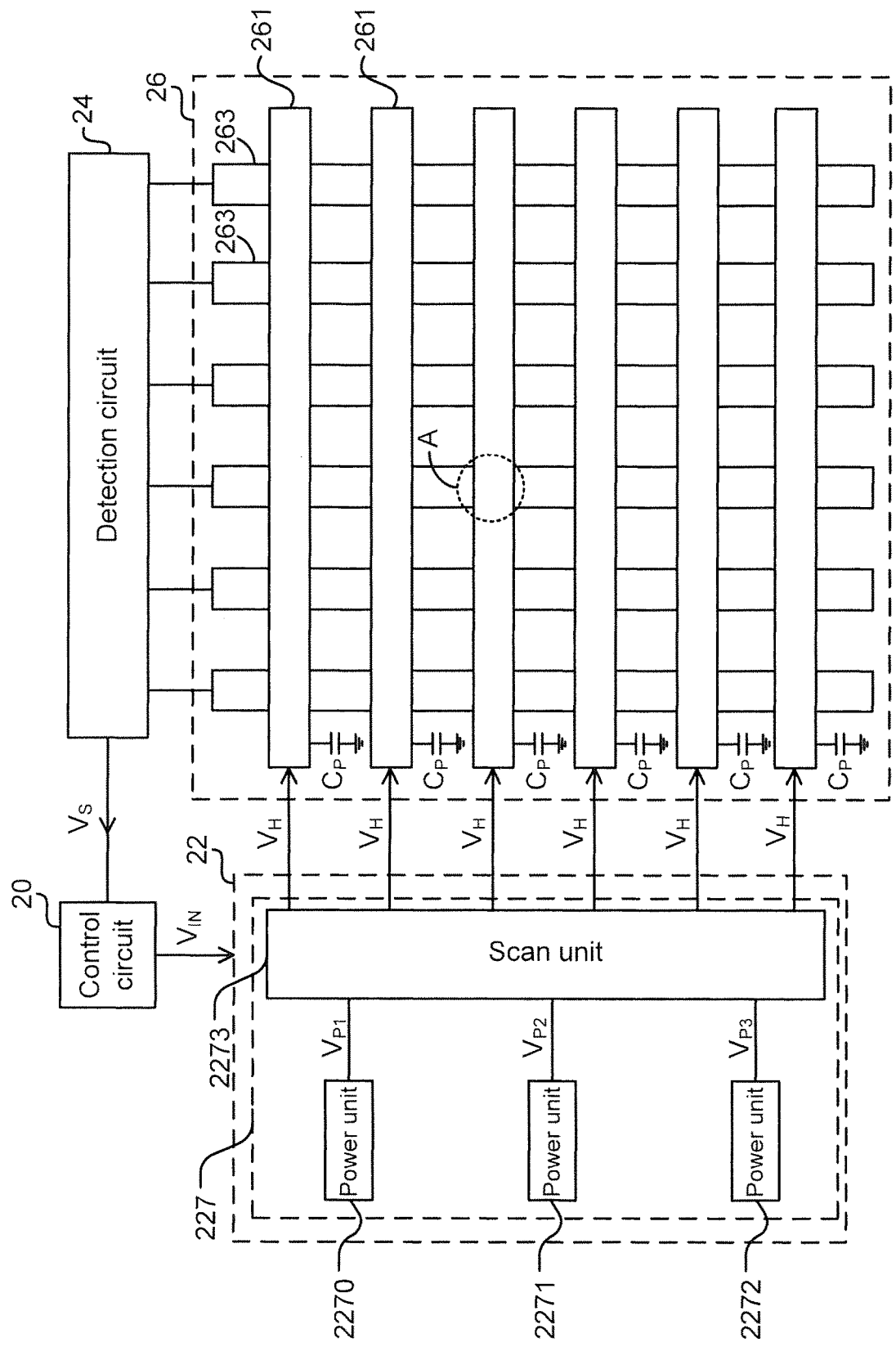
FIG. 3 shows a schematic diagram of the touch device according to the second embodiment of the present embodiment.

Please refer to FIG. 3, which shows a schematic diagram of the touch device according to the second embodiment of the present embodiment. The difference between the present embodiment and the one in FIG. 2 is that the signal generating circuit 227 according to the present embodiment adopts multiple power units 2270~2272 for a single scan unit 2273. In other words, the plurality of power units 2270~2272 provide supply voltages $V_{P1}$~$V_{P3}$ to the scan unit 2273 for providing power and enabling the scan unit 2273 to output scan signals $V_H$ to the plurality of scan electrodes 261 sequentially.

It is known from the embodiments in FIGS. 2 and 3 that, in addition to one-to-one correspondence between the plurality of power units 2210~2260 and the plurality of scan units 2212~2262 (as shown in FIG. 2) and the multiple-to-one correspondence between the plurality of power units 2270~2272 and the plurality of scan units 2273 (as shown in FIG. 3), there can be multiple signal generating circuits. Each signal generating circuits includes multiple power units for providing supply voltages to a scan unit.

Furthermore, no voltage stabilizing capacitor is required at the outputs of the plurality of power units 2270~2272; no voltage stabilizing capacitor is required at the input of the scan unit 2273; or no voltage stabilizing capacitor is required on the paths connecting the plurality of power units 2270~2272 with the scan unit 2273, respectively.

Besides, although the plurality of signal generating circuit 221~226 according to the first embodiment are coupled and corresponding to a scan electrode 261, the present invention is not limited to the case. The plurality of signal generating circuit 221~226 according to the present invention can be further coupled and corresponding to a plurality of scan electrodes 261. In addition, one of the signal generating circuits 221~226 provides the scan signal $V_H$ to the plurality of scan electrodes 261, respectively. There are many methods that the plurality of signal generating circuits 221~226 can be coupled to a plurality of scan electrodes 261. For example, delay circuits or switches can be used. These two methods are introduced in the following two embodiments of the present invention.

Figure 4:
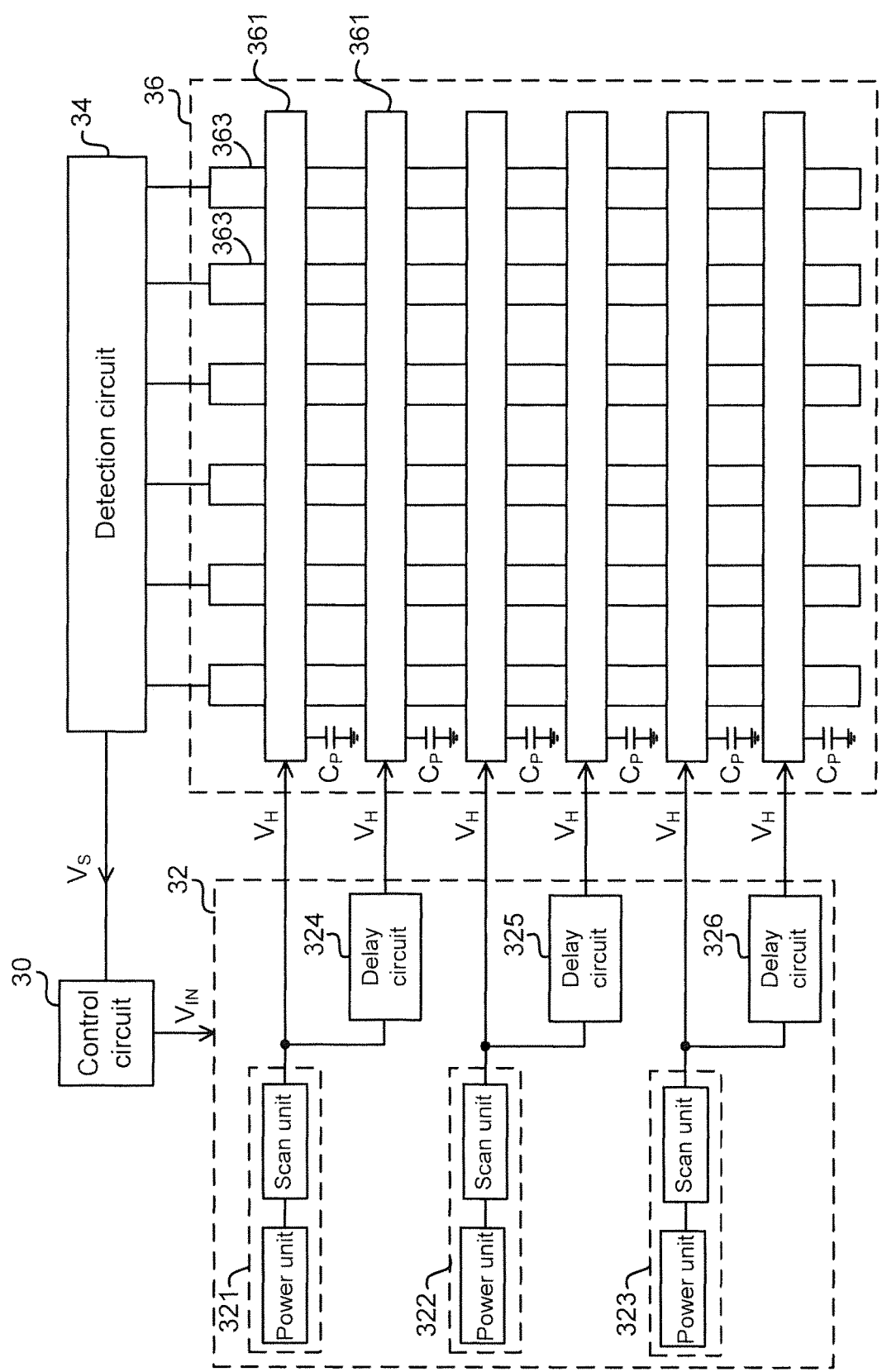
FIG. 4 shows a schematic diagram of the touch device according to the third embodiment of the present embodiment.

Please refer to FIG. 4, which shows a schematic diagram of the touch device according to the third embodiment of the present embodiment. As shown in the figure, the touch device according to the present embodiment comprises a control circuit 30, a scan circuit 32, a detection circuit 34, and a touch panel 36. The difference between the present embodiment and the previous one is on the scan circuit 32 only. Hence, the other parts will not be described again.

As shown in FIG. 4, the scan circuit 32 comprises a plurality of signal generating circuits 321~323 and a plurality of delay circuit 324~326. The plurality of signal generating circuits 321~323 are coupled to the first, third, and fifth scan electrodes 361 of the touch panel 36, respectively. The delay circuit 324 is coupled between the signal generating circuit 321 and the second scan electrode 361; the delay circuit 325 is coupled between the signal generating circuit 322 and the fourth scan electrode 361; the delay circuit 326 is coupled between the signal generating circuit 323 and the sixth scan electrode 361. The control circuit 30 transmits the input signal $V_{IN}$ to the plurality of signal generating circuits 321~323 sequentially, so that the plurality of signal generating circuits 321~323 can output the plurality of scan signals $V_H$ to the first, third, and fifth scan electrodes 361 and the delay circuits 324~326 sequentially.

The delay circuit 324 delays the scan signal $V_H$ output by the signal generating circuit 322 and outputs the signal to the second scan electrode 361; the delay circuit 325 delays the scan signal $V_H$ output by the signal generating circuit 322 and outputs the signal to the fourth scan electrode 361; the delay circuit 326 delays the scan signal $V_H$ output by the signal generating circuit 322 and outputs the signal to the sixth scan electrode 361. The delay time of the plurality of delay circuits 324~326 is smaller than the interval at which the plurality of signal generating circuits 321~323 generate the plurality of scan signals $V_H$ sequentially. In other words, the order at which the plurality of scan electrodes 361 receive the plurality of scan signals $V_H$ is from the first to the sixth.

Moreover, the plurality of signal generating circuits 321~323 described above can be coupled to the first, second, and third scan electrodes 361, respectively; the plurality of delay circuits 324~326 are coupled to the fourth, fifth, and sixth scan electrodes 361, respectively. The delay time of the plurality of delay circuits 324~326 is extended, so that the order at which the plurality of scan electrodes 361 receive the plurality of scan signals $V_H$ is also from the first to the sixth.

It is known from the above that, according to the present invention, one of the signal generating circuits 321~323 is coupled to two scan electrodes 361 for providing the scan signal $V_H$ to the two scan electrodes 361. Nonetheless, the present invention is not limited to the case. According to the present invention, one of the signal generating circuits 321~323 is coupled to a plurality of scan electrodes 361. Besides, the method described above, namely, delay circuits, can be used for generating the plurality of scan signals $V_H$ sequentially.

Figure 5:
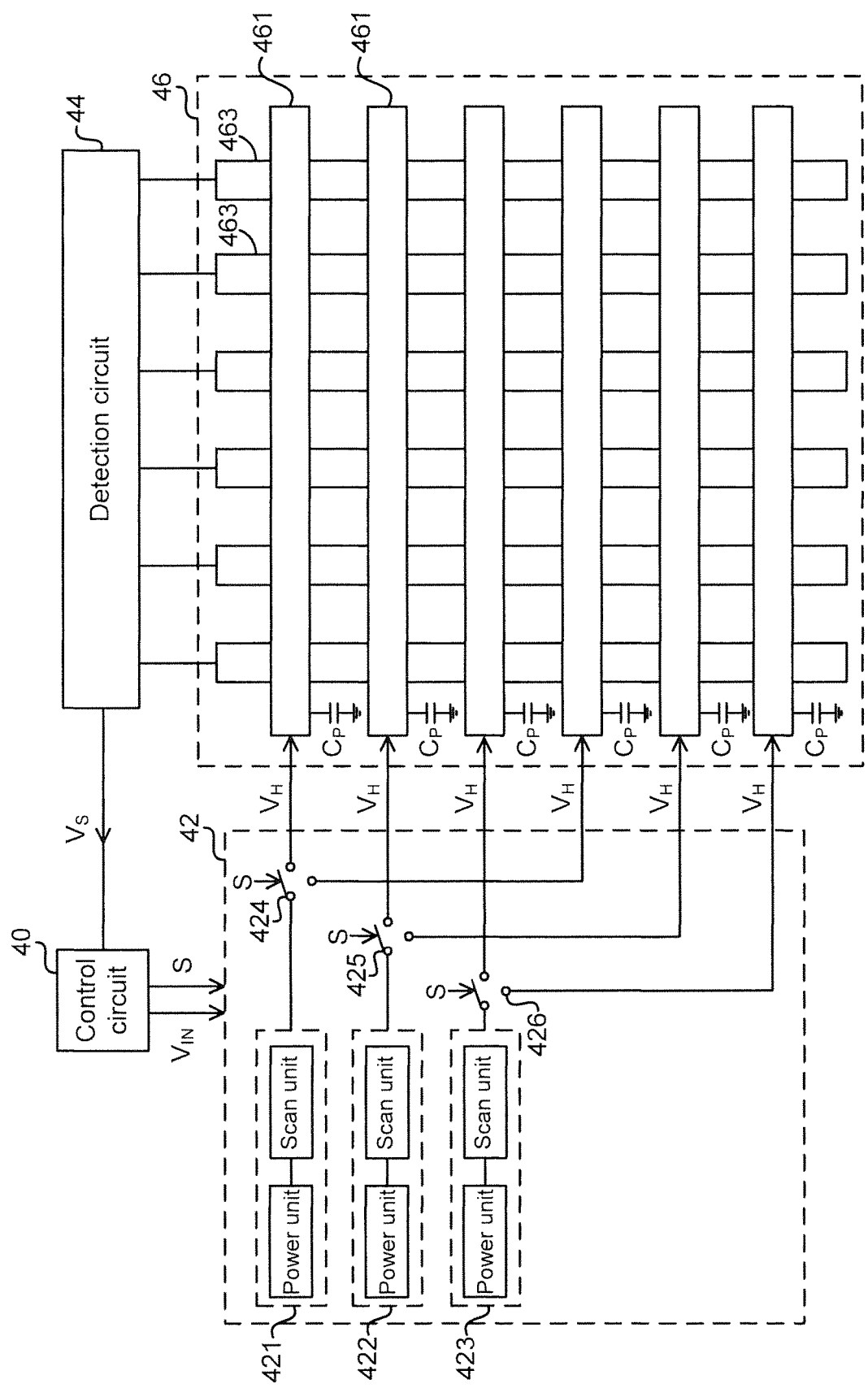
FIG. 5 shows a circuit diagram of the signal generating circuit according to the fourth embodiment of the present embodiment.

Please refer to FIG. 5, which shows a circuit diagram of the signal generating circuit according to the fourth embodiment of the present embodiment. The touch device according to the present embodiment comprises a control circuit 40, a scan circuit 42, a detection circuit 44, and a touch panel 46. The difference between the present embodiment and the previous one is on the scan circuit 42 only. Hence, the other parts will not be described again.

As shown in the figure, the scan circuit comprises a plurality of signal generating circuits 421~423 and a plurality of switches 424~426. The switch 424 is coupled between the signal generating circuit 421 and the first and fourth scan electrodes 461; the switch 425 is coupled between the signal generating circuit 422 and the second and fifth scan electrodes 461; the switch 426 is coupled between the signal generating circuit 423 and the third and sixth scan electrodes 461. The control circuit 40 transmits the input signal $V_{IN}$ to the plurality of signal generating circuits 421~423 sequentially, so that the plurality of signal generating circuits 421~423 can generate the plurality of scan signals $V_H$ sequentially.

The plurality of signal generating circuits 421~423 will output the plurality of scan signals $V_H$ repeatedly and sequentially. Initially, the switch 424 shorts the signal generating circuit 421 and the first scan electrode 461, the switch 425 shorts the signal generating circuit 422 and the second scan electrode 461, and the switch 426 shorts the signal generating circuit 423 and the third scan electrode 461. After the first, second, and third scan electrodes 461 receive the scan signals $V_H$ sequentially, the control circuit 40 outputs a switching signal S for controlling the plurality of switches 424~426, and switching the switch 424 to short the signal generating circuit 421 and the fourth scan electrode 461, switching the switch 425 to short the signal generating circuit 422 and the fifth scan electrode 461, and switching the switch 426 to short the signal generating circuit 423 and the sixth scan electrode 461. Thereby, the plurality of signal generating circuits 421~423 can output the plurality of scan signals $V_H$ to the fourth, fifth, and sixth scan electrodes 461 sequentially. After the fourth, fifth, and sixth scan electrodes 461 all receive the scan signals $V_H$, the control circuit 40 controls the plurality of switches 424~426 via the switching signal S to short to the first, second, and third scan electrodes 461. Then the above steps are repeated continuously.

Figure 6:
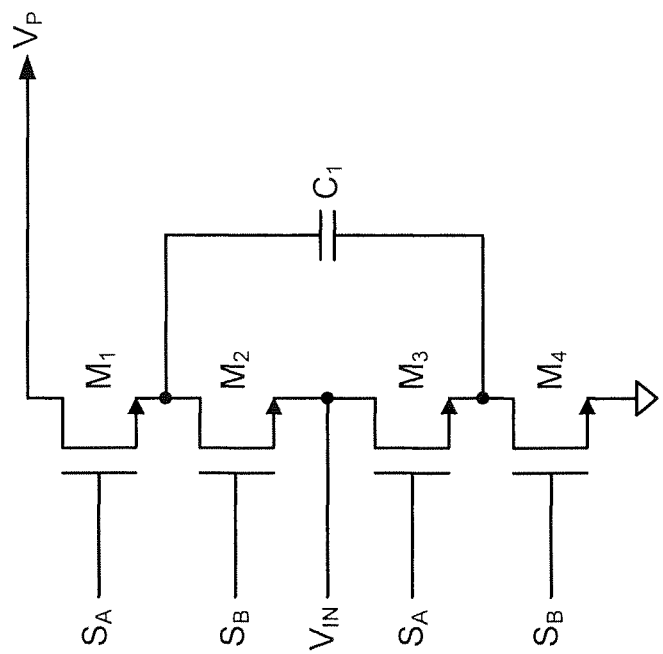
FIG. 6 shows a circuit diagram of the power unit according to the first embodiment of the present embodiment.

Please refer to FIG. 6, which shows a circuit diagram of the power unit according to the first embodiment of the present embodiment. As shown in the figure, the signal generating circuit according to the present invention is a charge pump, which comprises a plurality of transistors $M_1$~$M_4$ and a charging capacitor $C_1$. A first terminal of the transistor $M_1$ is coupled to an output of the signal generating circuit. A first terminal of the transistor $M_2$ is coupled to a second terminal of the transistor $M_1$. A first terminal of the transistor $M_3$ is coupled to a second terminal of the transistor $M_2$. A first terminal of the transistor $M_4$ is coupled to a second terminal of the transistor $M_3$. A second terminal of the transistor $M_4$ is coupled to a ground. A first terminal of the charging capacitor $C_1$ is coupled to the second terminal of the transistor $M_1$ and the first terminal of the transistor $M_2$. A second terminal of the charging capacitor $C_1$ is coupled to the second terminal of the transistor $M_3$ and the first terminal of the transistor $M_4$. In addition, the second terminal of the transistor $M_2$ and the first terminal of the transistor $M_3$ receive the input signal $V_{IN}$. The transistors $M_1$, $M_3$ are controlled by a switching signal $S_A$ for switching; the transistors $M_2$, $M_4$ are controlled by a switching signal $S_B$ for switching. The switching signals $S_A$, $S_B$ are mutually exclusive.

Initially, the switching signal $S_A$ is low and the switching signal $S_B$ is high; the transistors $M_1$, $M_3$ are cut off; the transistors $M_2$, $M_4$ are turned on. The input signal $V_{IN}$ is transmitted to the first terminal of the charging capacitor $C_1$ via the transistor $M_2$. The second terminal of the charging capacitor $C_1$ is coupled to ground via the transistor $M_4$. Hence, the charging capacitor $C_1$ will be charged to the level of the input signal $V_{IN}$. When charging is completed, the switching signal $S_A$ is changed to high and the switching signal $S_B$ is changed to low; the transistors $M_1$, $M_3$ are turned on; the transistors $M_2$, $M_4$ are cut off. The input signal $V_{IN}$ is transmitted to the second terminal of the charging capacitor $C_1$ via the transistor $M_3$. The first terminal of the charging capacitor $C_1$ is coupled to output of the signal generating circuit via the transistor $M_1$. Thereby, the voltage level of the input signal $V_{IN}$ is added by the voltage level across the charging capacitor $C_1$ via the transistor $M_3$ and then transmitted to the output of the signal generating circuit via the transistor $M_1$ as the supply voltage $V_P$. Accordingly, the signal generating circuit according to the present embodiment is a double charge pump.

Figure 7:
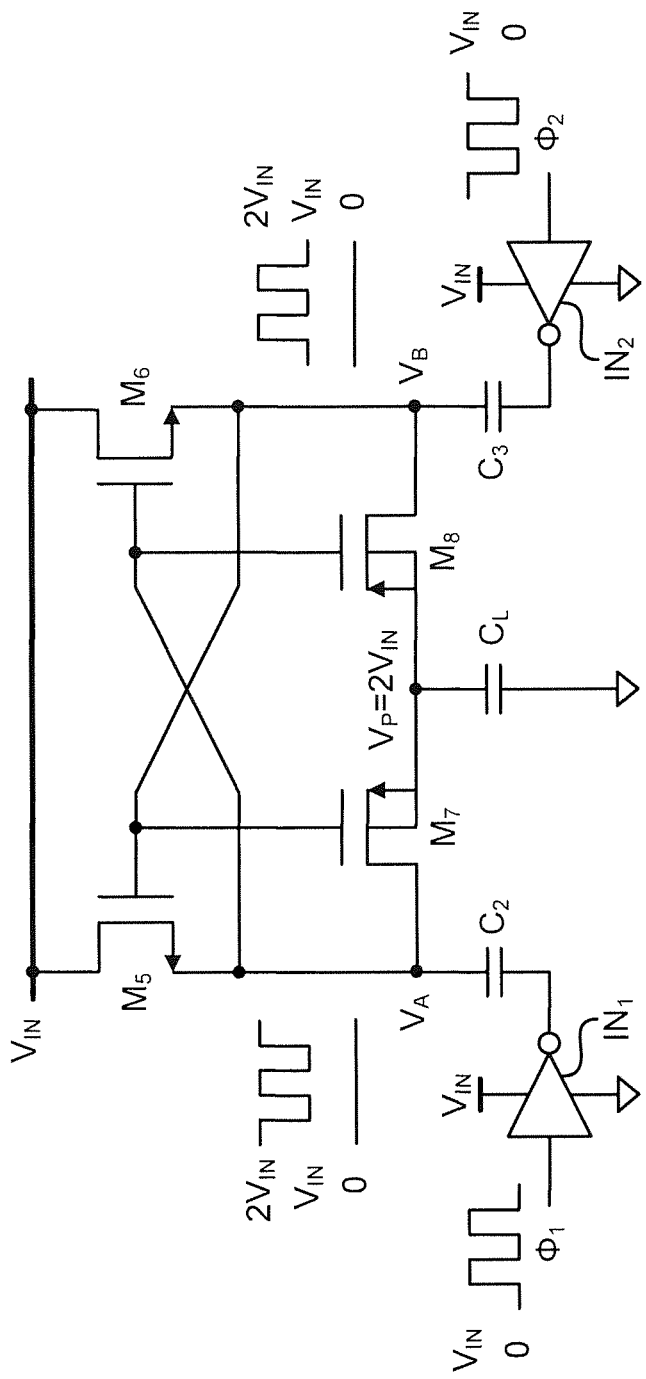
FIG. 7 shows a circuit diagram of the power unit according to the second embodiment of the present embodiment.

Please refer to FIG. 7, which shows a circuit diagram of the power unit according to the second embodiment of the present embodiment. As shown in the figure, the signal generating circuit according to the present embodiment is another type of charge pump, which comprises a plurality of transistors $M_5$~$M_8$, a plurality of charging capacitors $C_2$~$C_3$, a plurality of inverters $IN_1$~$IN_2$, and an output capacitor $C_L$. First terminals of the transistors $M_5$, $M_6$ both receive the input signal $V_{IN}$. A first terminal of the transistor $M_7$ is coupled to a second terminal of the transistor $M_5$ and a control terminal of the transistor $M_6$; a control terminal of the transistor $M_7$ is coupled to a control terminal of the transistor $M_5$ and a second terminal of the transistor $M_6$. A first terminal of the transistor $M_8$ is coupled to the second terminal of the transistor $M_6$ and the control terminal of the transistor $M_5$; a control terminal of the transistor $M_8$ is coupled to the control terminal of the transistor $M_6$ and the second terminal of the transistor $M_5$. The charging capacitor $C_2$ is coupled between the second terminal of the transistor $M_5$ and an output of the inverter $IN_1$. An input of the inverter $IN_1$ receives a clock signal $\Phi_1$; a power terminal of the inverter $IN_1$ receivers the input signal $V_{IN}$. The charging capacitor $C_3$ is coupled between the second terminal of the transistor $M_6$ and an output of the inverter $IN_2$. An input of the inverter $IN_2$ receives a clock signal $\Phi_z$; a power terminal of the inverter $IN_2$ receivers the input signal $V_{IN}$.

In the signal generating circuit according to the present embodiment, the input signal $V_{IN}$ is input to the first terminals of the transistors $M_5$, $M_6$. In addition, the mutually exclusive clock signals $\Phi_1$, $\Phi_2$ having a high level identical to that of the input signal $V_{IN}$ are used. After the inverters $IN_1$, $IN_2$, the outputs are connected to the charging capacitors $C_2$, $C_3$, respectively, making the node voltage levels $V_A$, $V_B$ located between the single input signal $V_{IN}$ value and the double input signal $V_{IN}$ value and charging the output capacitor $C_L$ via the transistors $M_7$, $M_8$ alternately to the double input signal $Y_{IN}$ value, which is used as the supply voltage $V_P$.

Figure 8:
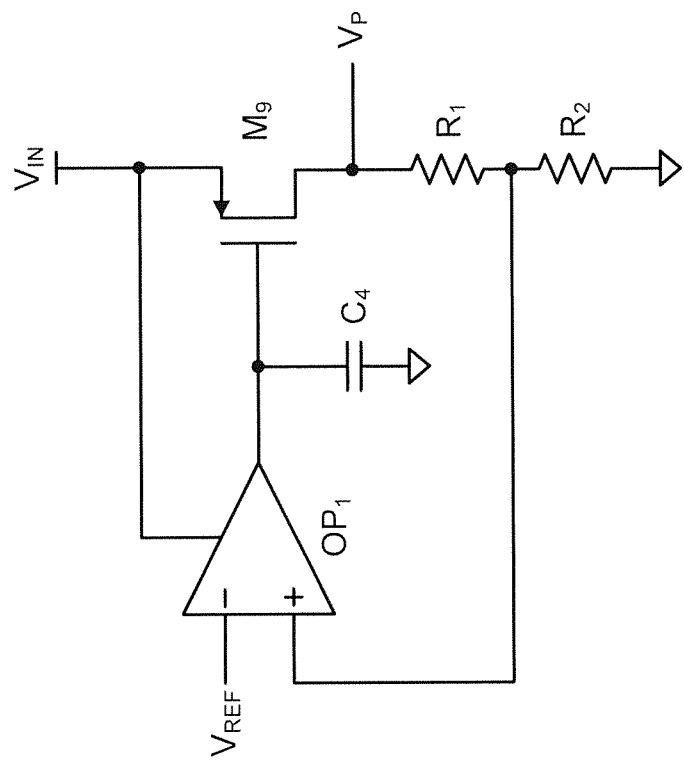
FIG. 8 shows a circuit diagram of the power unit according to the third embodiment of the present embodiment.

Please refer to FIG. 8, which shows a circuit diagram of the power unit according to the third embodiment of the present embodiment. As shown in the figure, the signal generating circuit according to the present embodiment is a LDO regulator, which comprises an operational amplifier $OP_1$, a capacitor $C_4$, a transistor $M_9$, and a plurality of resistors $R_1$, $R_2$. A negative input of the operational amplifier $OP_1$ receives a reference voltage $V_{REF}$. A power terminal of the operational amplifier $OP_1$ receives the input signal $V_{IN}$. The capacitor $C_4$ is coupled between an output of the operational amplifier $OP_1$ and the reference level. A control terminal of the transistor $M_9$ is coupled to the output of the operational amplifier $OP_1$. A first terminal of the transistor $M_9$ receives the input signal $V_{IN}$. The resistor $R_1$ is coupled between a second terminal of the transistor $M_9$ and a positive input of the operational amplifier $OP_1$. The resistor $R_2$ is coupled between the positive input of the operational amplifier $OP_1$ and the reference level. The second terminal of the transistor $M_9$ is also coupled to the output of the signal generating circuit for outputting the supply voltage $V_P$.

It is known from the above description that the power unit according to the present embodiment can be the above LDO regulator, which converts the input signal $V_{IN}$ into the supply voltage $V_P$ and outputs the supply voltage $V_P$ stably. The operational principle of an LDO regulator is well known to a personal having ordinary skill in the art. Hence, the details will not be described further.

Figure 9:
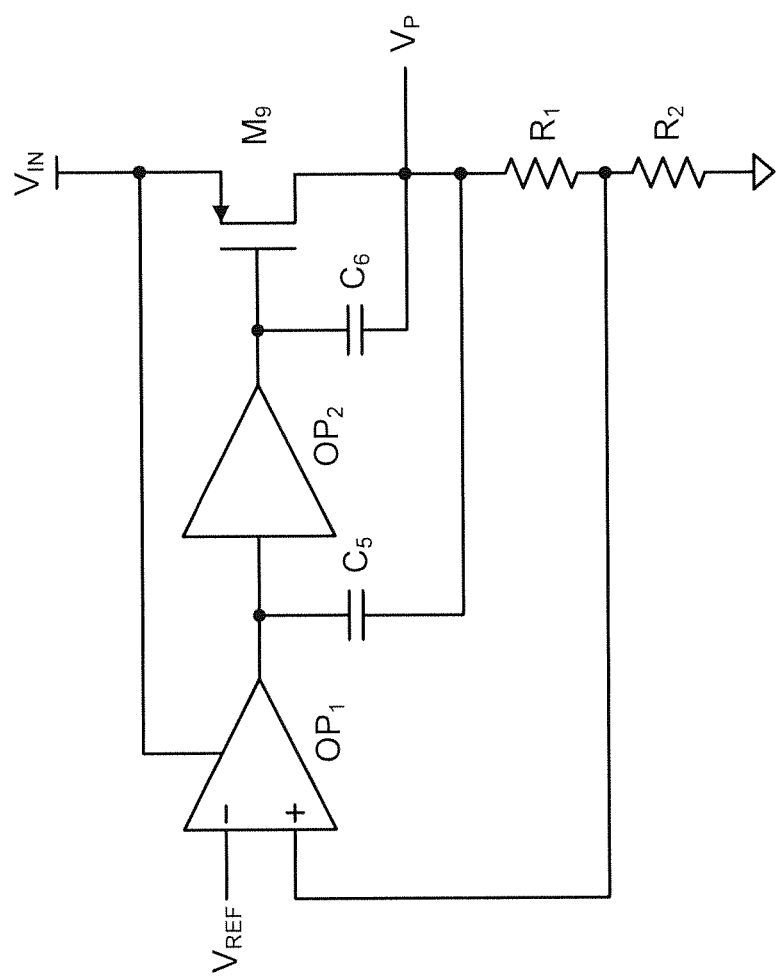
FIG. 9 shows a circuit diagram of the power unit according to the fourth embodiment of the present embodiment.

Please refer to FIG. 9, which shows a circuit diagram of the power unit according to the fourth embodiment of the present embodiment. As shown in the figure, the signal generating circuit according to the present embodiment is another type of LDO regulator. The difference between the present embodiment and the previous one is that the present embodiment further comprises an operational amplifier $OP_2$ and a plurality of capacitors $C_5$, $C_6$. The rest are the identical to the previous embodiment. The capacitor $C_5$ is coupled between the output of the operational amplifier $OP_1$ and the second terminal of the transistor $M_9$. An input of the operational amplifier $OP_2$ is coupled to the control terminal of the transistor $M_9$. The capacitor $C_6$ is coupled between the output of the operational amplifier $OP_2$ and the second terminal of the transistor $M_9$. The signal generating circuit according to the present embodiment, like the one according to the previous embodiment, can also convert the input signal $V_{IN}$ into the supply voltage $V_P$ and output the supply voltage $V_P$ stably.

In addition to being a charge pump, a boost circuit, or an LDO regulator, the power unit according to the present invention can also be any combination of the above-mentioned charge pump, boost circuit, and LDO regulator. That is to say, the power unit according to the present invention can be a combination of a boost circuit and an LDO regulator, or a combination of a charge pump and an LDO regulator.

Please refer to FIG. 10A, which shows a structural schematic diagram of the touch module. As shown in the figure, the touch module comprises the touch panel 5 and a driving module 6. The driving module 6 is connected electrically with the touch panel 5 for receiving the touch signal transmitted by the touch panel 5 and thus judging the touch located by a user. The driving module 6 includes a flexible printed circuit 60 and a driving chip 62. The driving chip 62 is disposed on the flexible printed circuit 60 and connected electrically with the touch panel 5. One side of the flexible printed circuit 60 is connected to one side of the touch panel 5. According to the present embodiment, the voltage stabilizing capacitor $C_R$ is connected externally on the flexible printed circuit 60.

Please refer to FIG. 10B, which shows a structural schematic diagram of the touch module according to the present invention. As shown in the figure, the difference between the present embodiment and the one in FIG. 10A is that the driving chip 62 according to the present embodiment includes the scan circuit 22 and the detection circuit 24. The scan circuit 22 comprises at least a signal generating circuit 221~226. The connection and operations among the scan circuit 22, the detection circuit 24, and the signal generating circuit 221~226 have been described above. Hence, the details will not be described here again. According to the present embodiment, the signal generating circuits 221~226 correspond to at least one of a plurality of scan electrodes of the touch panel 5, respectively, for receiving the input signal and generating a plurality of scan signals according to the input signal, and then transmit the plurality of scan signals to the plurality of scan electrodes, respectively, so that the parasitic capacitor $C_P$ of the plurality of scan electrodes can be used for stabilizing the scan signals. Thereby, the size of the voltage stabilizing capacitor $C_R$ required for the driving chip 62 can be shrunk significantly, making it no longer necessary to connect the voltage stabilizing capacitor $C_R$ externally on the flexible printed circuit 60 and thus achieving the purposes of saving circuit area and cost.

Figure 11:
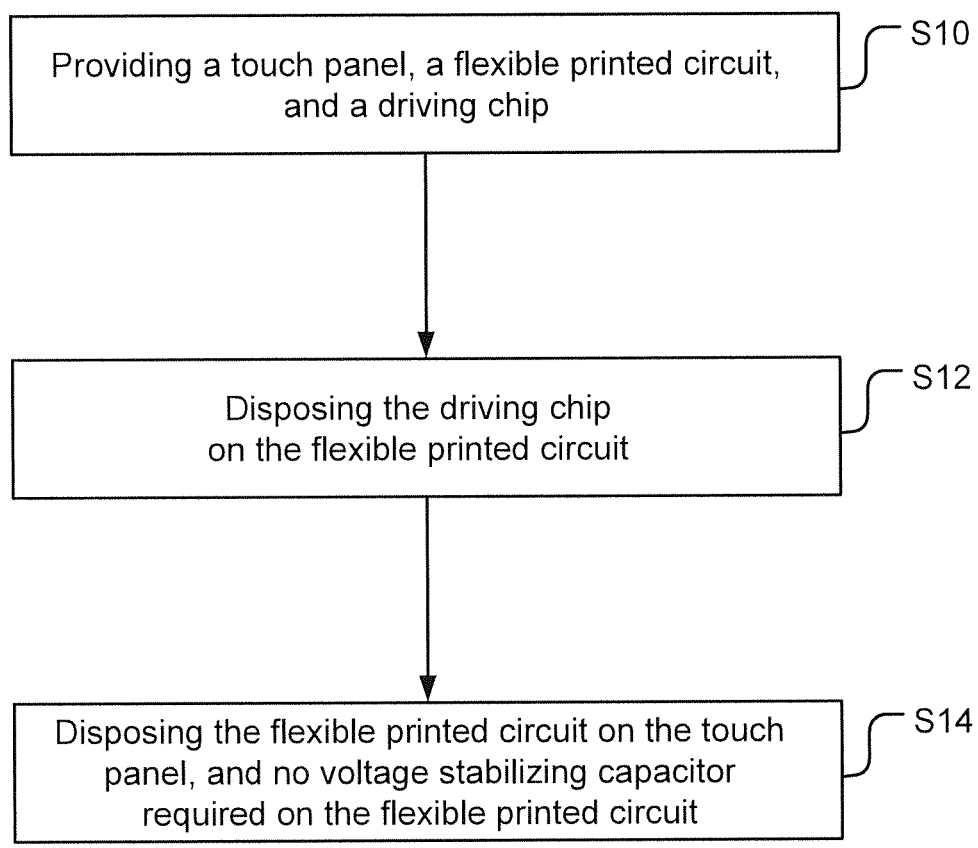
FIG. 11 show's a flowchart of the method for manufacturing the touch panel.

Please refer to FIG. 11, which shows a flowchart of the method for manufacturing the touch panel. As shown in the figure, the method for manufacturing the touch panel according to the present invention comprises the following steps. First, the step S10 is executed for providing a touch panel 5, a flexible printed circuit 60, and a driving chip 62. Then, the step S12 is executed for disposing the driving chip 62 on the flexible printed circuit 60, as shown in FIG. 10B. Afterwards, the step S14 is executed for disposing the flexible printed circuit 60 on the touch panel 5 and connected electrically with the driving chip 62. In addition, no voltage stabilizing capacitor $C_R$ is required on the flexible printed circuit 60, as shown in FIG. 10B.

According to the present embodiment, the signal generating circuits 221~226 correspond to at least one of a plurality of scan electrodes of the touch panel 5, respectively, for receiving the input signal and generating a plurality of scan signals according to the input signal, and then transmit the plurality of scan signals to the plurality of scan electrodes, respectively, so that the parasitic capacitor $C_P$ of the plurality of scan electrodes can be used for stabilizing the scan signals. Thereby, the size of the voltage stabilizing capacitor $C_R$ required for the driving chip 62 can be shrunk significantly, making it no longer necessary to connect the voltage stabilizing capacitor $C_R$ externally on the flexible printed circuit 60 and thus achieving the purposes of saving circuit area and cost. According to the present invention, the process step of connecting the voltage stabilizing capacitor $C_R$ externally on the flexible printed circuit 60 is not required. Thereby, the process time, and thus cost, can be saved.

To sum up, the present invention provides a driving circuit, the touch device thereof, the touch module thereof, and the method for manufacturing the same. The parasitic capacitor of the touch panel is used as the voltage stabilizing capacitor for achieving the purposes of saving circuit area and the cost of external capacitors.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A touch device comprising:
    a control circuit generating an input signal;
    a scan circuit comprising a plurality of signal generating circuits corresponding to at least one of a plurality of scan electrodes of a touch panel, respectively, said scan circuit receiving said input signal and generating a plurality of scan signals according to said input signal, and further transmitting said plurality of scan signals to said plurality of scan electrodes; and
    a detection circuit detecting said touch panel according to said plurality of scan signals and outputting a detection signal to said control circuit to indicate to said control circuit at least a touch point of said touch panel being touched;
    wherein each signal generating circuit includes:
        at least one power supply unit designated only for said signal generating circuit, said at least one power supply unit receiving an input supply voltage and amplifying a voltage level of said input supply voltage by a predetermined factor for generating a supply voltage as a power; and a scan unit receiving said supply voltage and outputting said at least a scan signal of said plurality of scan signals according to said supply voltage.

2. The touch device of claim 1, wherein each of said plurality of signal generating circuits is coupled to a corresponding one of said plurality of scan electrodes, respectively.

3. The touch device of claim 1, wherein said plurality of signal generating circuits are coupled to at least two of said plurality of scan electrodes, respectively.

4. The touch device of claim 3, wherein said plurality of signal generating circuits are coupled to at least a delay circuit, respectively, and said delay circuit is used for delaying said plurality of scan signals.

5. The touch device of claim 3, wherein said plurality of signal generating circuits are coupled to at least a switch, respectively, and said switch switches said plurality of signal generating circuits according to a switching signal and transmits said scan signal to at least two of said plurality of scan electrodes.

6. The touch device of claim 1, wherein no voltage stabilizing capacitor is required at the output of said power supply unit.

7. The touch device of claim 1, wherein no voltage stabilizing capacitor is required at the input of said scan unit.

8. The touch device of claim 1, wherein no voltage stabilizing capacitor is required on the path connecting said power supply unit and said scan unit.

9. The touch device of claim 1, wherein each of said plurality of scan electrodes has a parasitic capacitor for stabilizing at least one of said plurality of scan signals.

10. The touch device of claim 1, wherein the input supply voltage received by the at least one power supply unit is produced from the input signal generated by the control circuit.

11. The touch device of claim 1, wherein the power supply unit includes:
a first set of transistors;
a second set of transistors coupled to the first set of transistors, and a charging capacitor having a first terminal coupled to the first set of transistors and a second terminal coupled to the second set of transistors, the charging capacitor being selectively controlled in charging and discharging responsive to the first and second sets of transistors.

12. The touch device of claim 11, wherein each of the first and second sets of transistors includes a first type transistor and a second type transistor defining respective conduction paths coupled at an intermediate node, the first type transistors configured to be collectively controlled by a first switching signal, the second type transistors configured to be collectively controlled by a second switching signal, the first and second switching signals being complementary to each other.

13. The touch device of claim 12, wherein:
the first terminal of the charging capacitor is coupled to an intermediate node of the first set of transistors; and
the second terminal of the charging capacitor is coupled to an intermediate of the second set of transistors.

14. The touch device of claim 12, wherein the input supply voltage is supplied to a circuit node defined between the first and second sets of transistors.

15. A driving circuit of a touch device, comprising:
a control circuit generating an input signal; and
a plurality of signal generating circuits corresponding to a plurality of scan electrodes of a touch panel, respectively, receiving an input supply voltage, generating a plurality of supply voltages according to said input supply voltage, generating a plurality of scan signals according to said supply voltages, and transmitting said plurality of scan signals to said corresponding plurality of scan electrodes, respectively;
wherein each signal generating circuit includes:
at least one power supply unit designated only for said signal generating circuit, said at least one power supply unit receiving said input supply voltage and amplifying a voltage level of said input supply voltage by a predetermined factor for generating said supply voltage as a power; and
a scan unit receiving said supply voltage and outputting said at least a scan signal of said plurality of scan signals according to said supply voltage.

16. A touch module, comprising:
a flexible printed circuit used for connecting electrically to a touch panel; and
a chip disposed on said flexible printed circuit, including:
a control circuit generating an input signal; and
a plurality of signal generating circuits corresponding to a plurality of scan electrodes of said touch panel, respectively, receiving an input supply voltage and generating a plurality of supply voltages according to said input supply voltage, and further generating a plurality of scan signals according to said supply voltages, and transmitting said plurality of scan signals to said corresponding plurality of scan electrodes, respectively;
wherein each signal generating circuit includes:
at least one power supply unit designated only for said signal generating circuit, said at least one power supply unit receiving said input supply voltage and amplifying a voltage level of said input supply voltage by a predetermined factor for generating said supply voltage as a power; and
a scan unit receiving said supply voltage and outputting said at least a scan signal of said plurality of scan signals according to said supply voltage.

17. A method for manufacturing a touch panel, comprising steps of:
providing a touch panel, a flexible printed circuit, and a driving chip including a plurality of signal generating circuits transmitting a plurality of scan signals to a plurality of scan electrodes;
disposing said driving chip on said flexible printed circuit; and
disposing said flexible printed circuit on said touch panel;
where no voltage stabilizing capacitor is required on said flexible printed circuit;
wherein at least one power supply unit is disposed at each of the signal generating circuit for producing a supply voltage according to an input supply voltage, said at least one power supply unit designated only for said signal generating circuit, said at least one power supply unit receiving said input supply voltage and amplifying a voltage level of said input supply voltage by a predetermined factor for generating said supply voltage as a power; and
a scan unit is disposed at each of the signal generating circuit for receiving said supply voltage and outputting said at least a scan signal of said plurality of scan signals according to said supply voltage.

* * * * *